United States Patent [19]
Ward

[11] 3,934,216
[45] Jan. 20, 1976

[54] MAGNETIC DETENT DEVICE
[75] Inventor: Frank L. Ward, Kensington, N.H.
[73] Assignee: Clarostat Mfg. Co., Inc., Dover, N.H.
[22] Filed: Dec. 11, 1974
[21] Appl. No.: 531,757

[52] U.S. Cl. .................. 335/272; 310/152; 310/156
[51] Int. Cl.² .......................................... H01F 7/14
[58] Field of Search .................. 335/253, 272, 152; 310/154, 156

[56] References Cited
UNITED STATES PATENTS

| | | | |
|---|---|---|---|
| 2,212,192 | 8/1940 | Howell | 310/156 |
| 3,344,378 | 9/1967 | Wilhelmson | 335/272 |
| 3,473,061 | 10/1969 | Soehner et al. | 310/156 |

FOREIGN PATENTS OR APPLICATIONS

| | | | |
|---|---|---|---|
| 884,471 | 12/1961 | United Kingdom | 310/156 |

*Primary Examiner*—G. Harris

[57] ABSTRACT

A multi-position detent device in which a plurality of detent positions are available with each position determined by discrete magnetic fields established between stator and rotor pole pieces and in which both stator and rotor have a magnet sandwiched between pole members in which the pole pieces radially project with respect to the stator and rotor pole pieces of opposite polarity projecting toward each other.

3 Claims, 2 Drawing Figures

MAGNETIC DETENT DEVICE

BACKGROUND OF THE INVENTION

A detent device is one in which a moving part thereof is stopped due to the action of the device in a predetermined position. A multi-position rotary detent device is one in which a part which is capable of rotary movement is provided with a number of stopping points — each being in detent position. The stopping point in a detent device is not a positive stop but one in which an additional amount of energy or force must be provided or utilized in order to move out of that position.

Detent devices in various configurations are well known in the art. A detent device which is stopped or which has its detent positions determined by mechanical action has a relatively short life due to the frictional engagement of parts. It is important in many applications to have a relatively simple detent device which is capable of long life and one which is not subject to severe wear due to frictional engagement of parts.

SUMMARY OF THE INVENTION

A multi-position rotary detent device including a stator and a rotor in which each has a magnet and pole members adjacent the magnet surfaces with pole pieces formed on the pole members so that the respective pole pieces of one of the pole members of the stator project radially toward the pole pieces of one of the pole members of the rotor and the pole pieces of the remaining pole member of the stator project radially toward the pole pieces of the remaining rotor pole member with opposite pole pieces oppositely magnetically oriented so that the relative angular position of the stator and rotor determines the magnetic flux paths between selected pole pieces providing detent positions.

DESCRIPTION OF THE INVENTION

Figure 1:
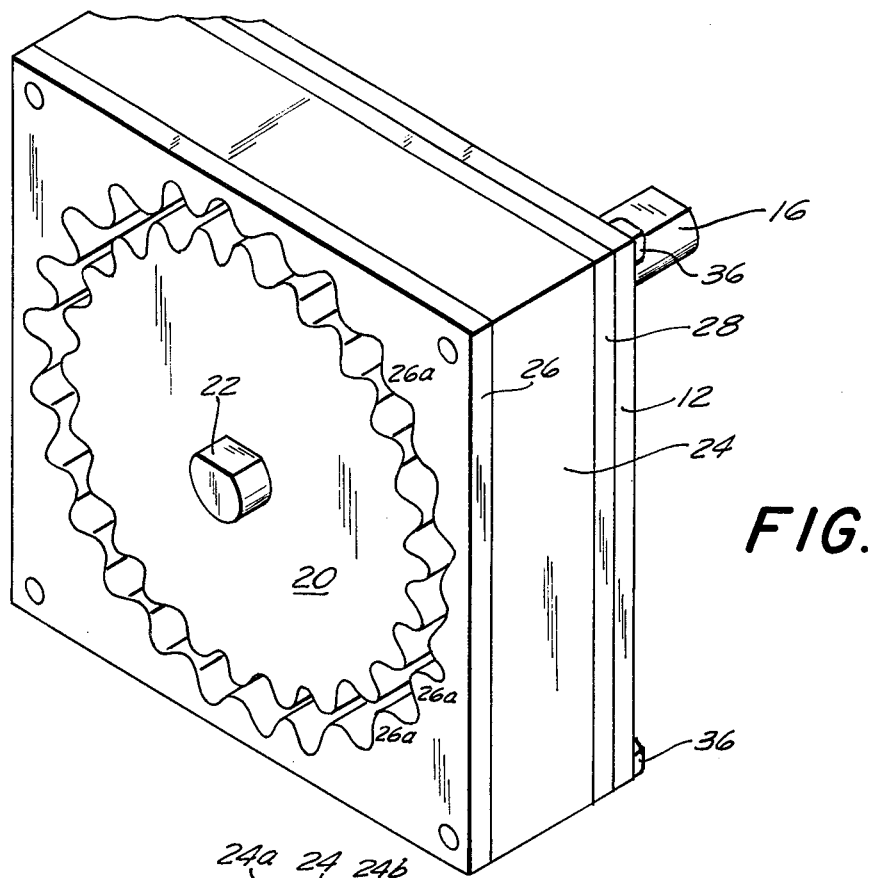
FIG. 1 is a front perspective view of a multi-position rotary detent device constructed in accordance with the teachings of this invention.
Figure 2:
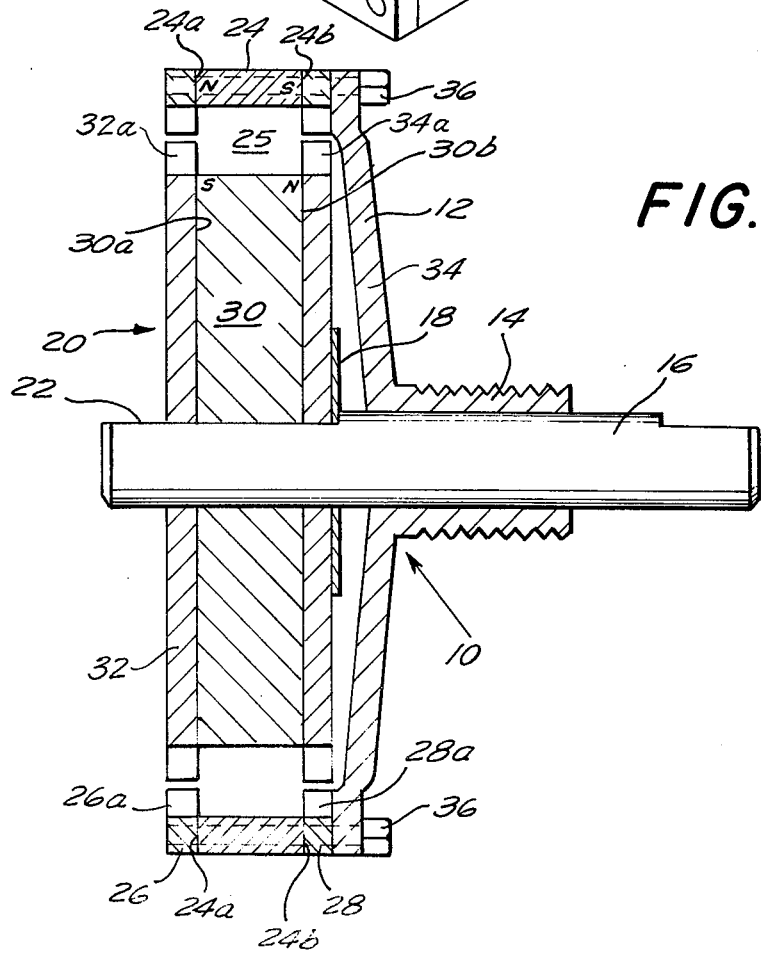
FIG. 2 is a longitudinal sectional view of the device shown in FIG. 1.

A multi-position detent device constructed in accordance with the invention is shown in FIGS. 1 and 2. Stator 10 of the device includes a generally square dished out base 12 which in the preferred embodiment is formed out of a non-magnetic material. In this embodiment bushing 14 is formed integral with the base and rotatably supports non-magnetic shaft 16. Flat washer 18 is also used in this embodiment in mounting the rotor 20 on shaft 16 at flattened surface portion or keyway 22 which is provided so that the rotor 20 cannot rotate relative to shaft 16. The stator 10 provides a first rotary member of the device and includes permanent magnet 24 having one surface which is designated 24a oriented magnetic north and a second surface which is designated 24b oriented magnetic south. The magnet is provided with a cylindrical cut out central portion 25. Magnet 24 is sandwiched between two pole members which are formed of a magnetizable material such as steel. These pole members are designated in the figures by the respective numerals 26 and 28 and are respectively adjacent surfaces 24a and 24b so that pole member 26 is magnetized north by the presence of magnet 24 and pole member 28 is magnetized south by the presence of magnet 24. Each of the pole members is provided with a central cut out portion somewhat similar to cut out portion 25 of magnet 24; however, the walls surrounding the respective cut out portions in the pole members are "wavy" or generally sinusoidal so that a plurality of radially inwardly projecting pole pieces are formed on each. The pole pieces of the pole member 26 are designated in the figures by the numeral 26a and the pole pieces of member 28 by the numeral 28a. In the embodiment described herein, pole pieces 26a are oriented magnetic north by the presence of magnet 24 and pole pieces 28a are oriented magnetic south by the presence of magnet 24.

The rotor 20 which provides a second rotary member of the device is constructed similar to the stator in that a second permanent magnet 30 is sandwiched between pole members 32 and 34 formed with pole pieces 32a and 34a which are magnetized south and north respectively due to the presence of the magnet 30. In the rotor the magnet 30 is a cylindrical disc having approximately the thickness of magnet 24 and is mounted on a shaft 16 with surface 30a oriented magnetic south and surface 30b oriented magnetic north. Pole member 32 is adjacent surface 30a so that the outwardly radially projecting pole pieces 32a formed by the sinusoidal periphery thereof are oriented magnetic south. Pole member 34 is adjacent surface 30b so that the outwardly radially projecting pole pieces 34a are oriented magnetic north. The dimensions of the parts is such that when assembled the rotor and stator are concentric with the rotor within the central opening in the stator and respective pole pieces of stator and rotor are spaced from one another.

Four screws 36 — two of which are seen in the figures — are threaded through corner threaded holes in the base and stator magnet and pole members to maintain these parts in relative position.

In the position of the rotor with respect to the stator that is shown in the FIGS. 1 and 2, the device is considered to be in the detent position and there are magnetic flux paths established between facing selected pole pieces of stator and rotor. The selected facing pole pieces are determined by the angular position of the shaft. Rotation of the shaft if desired could establish new flux paths with different pole pieces facing in the determination of additional detent positions.

What is claimed is:

1. A multi-position rotary detent device including, in combination, a first rotary member, a first magnet of said first rotary member having first and second magnetic surfaces respectively oriented magnetic north and magnetic south, first and second pole members of said first rotary member respectively adjacent said first and second magnetic surfaces, and first and second pole members being in fixed relation with said first magnet and formed of a magnetic material, radially projecting first and second pole pieces of said first and second respective pole members, a second rotary member rotatably supported with respect to said first rotary member, a second magnet of said second rotary member having third and fourth magnetic surfaces respectively oriented magnetic south and magnetic north, third and fourth pole members of said second rotary member respectively adjacent said third and fourth magnetic surfaces, said third and fourth pole members being in fixed relation with said second magnet and formed of a magnetic material, radially projecting third and fourth pole pieces of said third and fourth respective pole members, said first and third pole pieces projecting toward each other, said second and fourth pole pieces projecting toward each other, and means for relatively rotating said first and second rotary members whereby the relative angular position of said first rotary member with respect to said second rotary member determines the magnetic flux paths between selected first and third pole pieces and selected second and fourth pole pieces.

2. A multi-position rotary detent device in accordance with claim 1 in which said first rotary member constitutes the stator and said second rotary member constitutes the rotor of the device.

3. A multi-position rotary detent device in accordance with claim 1 in which said second magnet is a circular disc and said third and fourth pole members are discs with said third and fourth pole pieces projecting outwardly respectively in the planes thereof.

* * * * *